(12) United States Patent  (10) Patent No.: US 9,036,314 B2
Kanamori et al.  (45) Date of Patent: May 19, 2015

(54) SYSTEMS AND METHODS PROVIDING CURRENT PROTECTION TO AN ELECTRONIC SYSTEM

(75) Inventors: Takashi Kanamori, San Jose, CA (US); Roshan Thakur, Fremont, CA (US)

(73) Assignee: NetApp, Inc., Sunnyvale, CA (US)

( * ) Notice: Subject to any disclaimer, the term of this patent is extended or adjusted under 35 U.S.C. 154(b) by 256 days.

(21) Appl. No.: 13/458,051

(22) Filed: Apr. 27, 2012

(65) Prior Publication Data

US 2013/0286525 A1  Oct. 31, 2013

(51) Int. Cl.
*H02H 9/02* (2006.01)
*H02H 9/00* (2006.01)

(52) U.S. Cl.
CPC ...................................... *H02H 9/004* (2013.01)

(58) Field of Classification Search
CPC .................................. H02H 9/004; H02H 9/02
USPC ............................................ 361/90–99, 93.9
See application file for complete search history.

(56) References Cited

U.S. PATENT DOCUMENTS

| | | | | |
|---|---|---|---|---|
| 4,678,984 A | * | 7/1987 | Henze | 323/285 |
| 5,305,174 A | * | 4/1994 | Morita et al. | 361/63 |
| 5,519,264 A | * | 5/1996 | Heyden et al. | 307/125 |
| 7,495,499 B2 | * | 2/2009 | Chung et al. | 327/427 |
| 2003/0035311 A1 | * | 2/2003 | Phadke | 363/89 |
| 2007/0188198 A1 | * | 8/2007 | Bird | 327/63 |
| 2008/0174926 A1 | * | 7/2008 | Evans et al. | 361/90 |
| 2012/0087199 A1 | * | 4/2012 | Tejada | 365/227 |

OTHER PUBLICATIONS

"Hot Swap Controller with Multifunction Current Control", Linear Technology Corporation, 36 pages.
"Dual Supply Hot Swap Controller", Linear Technology Corporation', 16 pages.

* cited by examiner

*Primary Examiner* — Thienvu Tran
*Assistant Examiner* — Kevin J Comber
(74) *Attorney, Agent, or Firm* — Haynes and Boone, LLP

(57) ABSTRACT

A computing device including a power connector to interface with a power source, logic and power components on a current path from the power connector; the power connector providing electrical power to the logic and power components, and an inrush protection circuit on the current path between the power connector and the logic and power components, the inrush protection circuit including: a first power dissipation device and a second power dissipation device arranged in parallel on the current path, a feedback loop to detect an amount of current in the current path and to control the first power dissipation device to operate in a manner to dissipate detected inrush current, and a first time delay network in communication with the second power dissipation device and causing a delay for the second power dissipation device to transition to an on state, wherein during steady state.

21 Claims, 5 Drawing Sheets

SYSTEMS AND METHODS PROVIDING CURRENT PROTECTION TO AN ELECTRONIC SYSTEM

TECHNICAL FIELD

The present description relates, in general, to current protection and, more specifically, to techniques using an arrangement of parallel transistors to protect a circuit against high current levels.

BACKGROUND

Conventional systems may use server computers or storage devices that are arranged on blades or motherboards within a rack. The backplane of the rack has power and data connections, where the focus of this discussion is on power. The motherboard or blade has power connectors that physically interface with the power connections on the backplane of the rack, thereby providing power to the components on the motherboard or blade. In one example, 230V AC power is converted to 12V DC power and provided to the backplane. The motherboard or blade receives the 12V DC and, if needed, may perform further power conversion internally.

Furthermore, some conventional systems require high availability and are not usually turned off even for adding/removing a component from the rack. For instance, some storage systems that have multiple motherboards interfacing with a backplane provide for a technique called "hot swapping," where a motherboard can be added and/or removed from a rack without powering off the rack. However, in the case of adding a motherboard to a powered rack, the motherboard may experience inrush current. In some instances, inrush current is caused when the uncharged capacitors on a motherboard draw current the instant the motherboard is plugged into the power bus. As the capacitors become charged, the inrush current decreases to zero. It should be noted that inrush current is in addition to any operating current being drawn into the motherboard, so that the total instantaneous current can be quite high and may cause damage to the circuits and/or cause a circuit breaker or fuse to break the circuit.

Various solutions have been proposed for handling inrush current. One conventional solution uses Field Effect Transistors (FETs) in the current path to supply power for the inrush current. A conventional inrush FET causes a voltage drop in series with the power delivering path (even during steady state, after the initial inrush is over). Furthermore, it is desirable that an inrush FET be able to withstand large instantaneous power surge when operating in its linear region during turn-on. Therefore, in many instances, it would be desirable to have an inrush FET with a low on-resistance (or Rdson, the resistance in steady state operation) and a wide Safe Operating Area (SOA, a limit of instantaneous power). The dilemma is that an FET with a wide SOA is usually large in size and does not necessarily have a low on-resistance, and an FET with a low on-resistance is usually small in size and with a narrow SOA. Hence, system designers have in the past placed several large FETs in parallel to guarantee a small voltage drop for the circuit during steady state and a large SOA for each of the individual FETs, but at the cost of a large foot print for the circuit.

In one example, a conventional system places multiple, large FETs in parallel with respect to each other within the current path of a motherboard. When the motherboard is placed in a rack and interfaced with a hot power bus, the inrush current begins. The multiple, large FETs all begin conducting at the same time in their linear regions, supplying the inrush current and generating heat energy from the inrush current. After a certain time, the multiple, large FETs leave their linear regions and enter their ON states for steady state operation of the motherboard. The on-resistance for an individual FET is less than the apparent resistance for the same FET during linear region operation. Also, the parallel arrangement of the FETs provides a total resistance that is lower than that of any one of the individual FETs. Thus, the current path of the motherboard, during steady state operation, is not impeded by the resistance of the parallel FETs. While such a solution operates well enough for some applications, the multiple, large FETs may take up an undesirably large amount of space on the motherboard. Thus, such a solution may be space-inefficient.

BRIEF DESCRIPTION OF THE DRAWINGS

The present disclosure is best understood from the following detailed description when read with the accompanying figures.

SUMMARY

Figure 1:
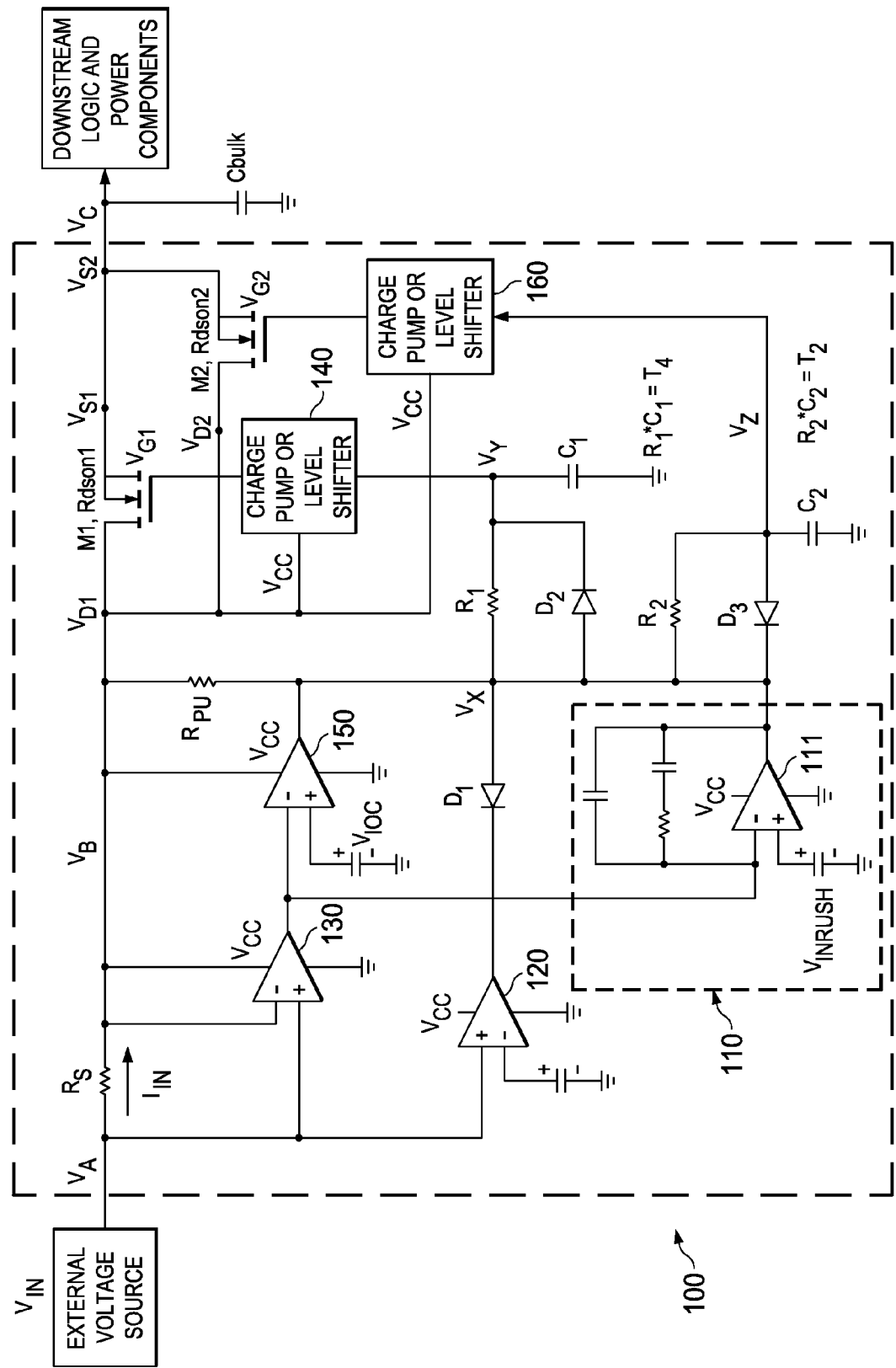
FIG. 1 is an illustration of an example circuit adapted according to one embodiment.

Various embodiments include systems and methods to provide current protection. In one example, a first power dissipation device and a second power dissipation device are connected in a parallel network within the current path of a computing system. The second power dissipation device is associated with a time delay circuit. When the system experiences inrush current the first power dissipation device is on and provides power dissipation, whereas the time delay network keeps the second power dissipation device off. Sometime after the inrush current has been dissipated, the second power dissipation device turns on and conducts power in parallel with the first power dissipation device. In one example, the first power dissipation device is a larger device that has a higher on-resistance, whereas the second power dissipation device is a smaller device that has a lower on-resistance. The system uses the first power dissipation device to handle the inrush current and uses the first and second devices in parallel for a low equivalent on-resistance during steady state operation.

One of the broader forms of the present disclosure involves a computing device that includes a power connector to interface with a power source, logic and power components on a current path from the power connector; the power connector providing electrical power to the logic and power components, and an inrush protection circuit on the current path between the power connector and the logic and power components, the inrush protection circuit including: a first power dissipation device and a second power dissipation device arranged in parallel on the current path, a feedback loop to detect an amount of current in the current path and to control the first power dissipation device to operate in a manner to dissipate detected inrush current, and a first time delay network in communication with the second power dissipation device and causing a delay for the second power dissipation device to transition to an on state, wherein during steady state operation of the computing device both the first and second power dissipating devices are in an on state.

Another of the broader forms of the present disclosure involves a hot-swappable electronic system including a power input providing power from a power source, over a current path, to operating circuitry, an inrush current protector on the current path between the power input and the operating circuitry, the inrush current protector including: a first power dissipation device of a first size in communication with a feedback loop to control the first power dissipation device to provide an inrush current, a second power dissipation device of a second size different from the first size, the first and second power dissipation devices being configured in a parallel network, and a first time delay network in communication with the second power dissipation device turning the second power dissipation device on during steady state operation of the electronic system.

Another of the broader forms of the present disclosure involves a method for handling current in a hot-swappable electronic system, the method performed using a current protection circuit that includes a first power dissipation device and a second power dissipation device, where the second power dissipation device is associated with a time delay network, the method including interfacing the electronic system to a power source, thereby providing power to the electronic system, charging a capacitance in the electronic system with the power, thereby causing an inrush current, sensing the inrush current and supplying power for the inrush current using the first power dissipation device while the second power dissipation device is in an off state, and using the time delay network to turn on the second power dissipation device after the inrush current is over so that the electronic system has a low impedance after the first and second power dissipation devices are on.

Another of the broader forms of the present disclosure involves a method for handling current in a hot-swappable electronic system, the method performed using a current protection circuit that includes a first power dissipation device and a second power dissipation device, where the first power dissipation device is associated with a time delay network, the method including during steady state operation of the electronic system, when both the first and second power dissipation devices are on, sensing an over current condition, in response to sensing the over current condition, turning the second power dissipation device off, using the time delay network to keep the first power dissipation device on as the second power dissipation device is off, and dissipating power during the over current event using the first power dissipation device.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

It is understood that various embodiments may be implemented in any kind of computing environment where a component may experience high current levels. For example, some embodiments may be implemented in computer motherboards, where the motherboards are adapted to be added to or removed from a hot power bus. Other embodiments may be implemented in a storage environment wherein one or more controllers or drive enclosures may be added to or removed from a hot power bus. Examples of storage environments include a Network Attached Storage (NAS), a Storage Area Network (SAN), or any other network storage configuration. Various embodiments are not limited to any particular network architecture or purpose and may be adapted for use in a wide-ranging array of environments. In fact, various hot swappable systems may benefit from the concepts described below.

Various embodiments disclosed herein provide techniques to provide current protection to an electrical system. One example includes a circuit that has two power dissipating devices and a time delay network to turn the power dissipating devices on sequentially. During a hot insertion, a larger power dissipating device that has a larger SOA becomes active first by leaving its OFF state, thereby dissipating any inrush current to the device.

After a certain time, the second power dissipating device becomes active. The second power dissipating device is a smaller element with a smaller SOA than that of the first power dissipating device. The second power dissipating device has a lower on-resistance than the first power dissipating device, and it is placed in parallel with the first power dissipating device. The combined, parallel resistance of the first and second power dissipating devices is less than that of either one of the devices individually and less than a resistance applied by the first device to the inrush current. During a steady state operating mode of the circuit, the first and second power dissipating devices are both on and arranged in a parallel network in the current path of the circuit, thereby providing a low on-resistance to the current path.

In one example embodiment, the first and second power dissipation devices are Field Effect Transistors (FETs). FETs have three operating states—an OFF state in which the FET conducts no current from its source to its drain, an ON state in which the FET conducts current from its source to its drain with a relatively small amount of resistance, and a linear operating region in which the transistor acts like an amplifier and conducts current from its source to its drain with a higher resistance that results in appreciable power dissipation. In the example above, the first FET operates in its linear region to dissipate the power of the inrush current, and both the first and second FETs are in their ON states during steady state.

During an over current shutdown, the second power dissipation device is shut off relatively quickly to protect it from large currents. However, a time delay circuit is used to ensure that the first power dissipating device remains on and dissipates power from the over-current event. Thus, various embodiments provide a robust solution for high currents in some electronic systems. The figures below illustrate example embodiments in more detail.

FIG. 1 is an illustration of an example inrush protection circuit 100, adapted according to one embodiment. Inrush protection circuit 100 is placed between an external voltage source VIN (e.g., 12V DC from a power bus on a backplane) and a capacitor CBulk and the rest of the power conversion and logic circuits. In one embodiment, inrush protection circuit 100 is one feature of many features on a computing component, such as a motherboard, where inrush protection circuit 100 is arranged on a current path from the external voltage source to the system logic and power components. Cbulk is a conceptual representation of one or more than one capacitive components on the computing component. The bulk capacitor CBULK represents the total amount of capacitance in the downstream system (for example, the total of the input capacitors of the DC to DC power converters on the motherboard).

The following example describes the components of FIG. 1 with respect to an example hot insertion. The unpowered (or new) motherboard is inserted into a backplane, where the backplane interfaces with the new motherboard and the motherboards (not shown) that are already present and powered up. Thus, the present example assumes that the power bus is active or "hot". The motherboards that are already present are busy with computing tasks before and after the insertion. When the new motherboard contacts the backplane, the bus voltage is applied to the point VA on the new motherboard.

As explained further below, the inrush FET M1 and the feedback loop 110 operate to dissipate inrush current. Furthermore, circuit 100 shuts M1 and M2 off when an over current event happens. An over current event in this example refers to a scenario wherein the current on the current path between VIN and the system reaches an unsafe value which is even higher than an expected inrush current. In other words, circuit 100 protects against inrush current and over current events, and inrush current is not usually expected to trigger over current protection.

Immediately after insertion, the voltage at VA rises. When the voltage at VA rises above the under voltage threshold detected by the under voltage comparator 120, the output of under voltage comparator 120 becomes a high impedance state, which releases the voltage at VX, and the current through diode D1 stops. The amplifier (opamp) 111, then takes control of the voltage at VX, thereby enabling feedback loop 110.

Current sense amplifier 130 monitors inrush current across the sense resistor I1. IIN is the total input current, and the inrush current may be a component of IIN, along with any operational current. The output of amplifier 130 is fed to feedback loop 110 to allow feedback loop 110 to react the size of the inrush current. The output of amplifier 130 is also fed to over current comparator 150 to monitor for an over current event. Over current events are described in more detail below.

Feedback loop 110 includes opamp 111 and an RC network between the inverting input of the opamp 111 (labeled "-") and the output of opamp 111. Feedback loop 110 forces the inrush current to be the same as the desired inrush current level programmed by VINRUSH. Feedback loop 110 forces the inrush current to a desired value by affecting VX, and thereby affecting VY through R1 and D2. Voltage VY controls charge pump 140 to apply a voltage VG1 to the gate of M1, keeping M1 in its linear operating region and dissipating substantial energy from the inrush current. Some embodiments include setting VINRUSH manually or automatically by applying a DC voltage across a capacitor, as shown in FIG. 1. In some embodiments VINRUSH is set during manufacture of circuit 100 by use of a DC voltage cell or other technique. VINRUSH is set a level that causes feedback loop 110 to force the inrush current to a safe level.

Charge pumps 140 and 160 boost the voltages VY and VZ by a certain ratio to generate VG1 and VG2 on the gates of the FETS M1 and M2, respectively. Voltages VG1 and VG2 are used to switch M1 and M2 from an OFF state to a linear operating region or an ON state. It should be noted that in the present example illustration, M2 is still in the OFF state. Further in this example it is assumed that any delay in operating charge pumps 140, 160 is negligible.

The present example uses charge pumps 140, 160 to boost a voltage in order to trigger N-channel FETs M1 and M2 by making the gate voltages (VG1, VG2) higher than the source voltages (VS1, VS2). However, the scope of embodiments is not limited N-channel FETs or even to FETs at all. Rather, other embodiments may use P-channel FETs, JFETs, Bipolar Junction Transistors (BJTs), both PNP-type and NPN-type), Insulated Gate Bipolar Transistors (IGBTs), or other transistors, thyristors, or the like. Also, various embodiments may use components other than charge pumps 140, 160. Any appropriate component to adjust voltages VG1, VG2, such as level shifters, may be used instead of charge pumps.

As explained above, feedback loop 110 controls voltages VX and VY to cause FET M1 to leave the OFF state. While the inrush current is large, FET M1 operates in its linear region and dissipates power from the inrush current. The dissipated power is the multiple of the drain to source voltage and the current going through the FET (also discussed at Equation (4) below with respect to FIG. 2).

The power provided at M1 at this time tends to be very high. In this example, M1 is a conventional FET built on a silicon die and then packaged using a plastic or ceramic die package with metal pins that contact the motherboard. A large FET is preferred for M1 because the localized heat at M1 should spread as widely as possible inside M1's die package. If the localized heat exceeds heat specification inside the package, M1 may get damaged. However, a large FET may also have an on-resistance that is too high, at least by itself, to be optimum for use in the current path.

While the inrush current control opamp 111 and feedback loop 110 are forcing the inrush current to conform to a desired inrush current level, M2 remains off because of the RCD network—D3, R2 and C2 in FIG. 1. M2 remains off because the reverse biased diode D3 blocks the charging current into C2, and so the charging current goes through the resistor R2 instead. The delay of the RCD network is given by Equation (1). Therefore only M1 is in the linear region, experiencing the high current flow. M2 switches from its OFF state only after T2.

$$T2 = R2 * C2 \qquad \text{Equation (1)}$$

In this example, the inrush current is a result of CBulk charging. But after the input voltage VIN is applied for some time, CBulk will eventually be fully charged. After CBulk has finished being charged to the same level as the bus voltage, the inrush current drops to zero or nearly zero. Thus, the current going through the sense resistor I1 decreases because the input current IIN at that point is only the current being used by the downstream load input logic and power components rather than the downstream load current plus the inrush current. In this example, R2 and C2 are chosen so that T2 is longer than the expected time for the inrush current to drop to zero or nearly zero.

When the inrush current goes to zero, the output of inrush current control opamp 111 in feedback loop 110 turns to a high impedance state, which allows the node VX to be pulled all the way up to VCC. VCC is the system voltage, and it may or may not be the same as the bus voltage VIN. At the expiration of time T2, which may be sometime after VX is pulled up to VCC, the capacitor C2 is charged up fully by the current going through R2. Once capacitor C2 is charged, current passing through R2 goes to charge pump 160. In response to this current, charge pump 160 applies a voltage VG2 to turn M2 to its ON state. Similarly, current to charge pump 140 controls M1 to be in its ON state (as opposed to its linear operating region).

The drain to source voltage across M2 is small because the inrush current is already diminished prior to M2's turn on. Therefore, the power loss during M2's turn-on is very small, where once again, the power loss is the multiple of the drain to source voltage for M2 and the current across M2. This designed-in small power loss allows the use of a single small-sized FET with low on-resistance for M2.

The equivalent resistance of M1 and M2, from the perspective of the system that is downstream from M1 and M2, is given by Equation (2). Equation (2) assumes that both M1 and M2 are in their ON states, and Rdson is a drain to source on-resistance. According to Equation (2), the equivalent resistance of M1 and M2 in parallel is smaller than that of either M1 or M2 alone. In fact, in a design wherein the on-resistance of M2 is much smaller than the on-resistance of M1, the equivalent resistance will be closer to that of M2 than M1. A corollary of this principal is that if the on-resistance of M2 is small enough relative to the on-resistance of M1, nearly all system operating current goes through M2 in the steady on-state since the current chooses the lower resistance path between M1 and M2.

$$REQ = RdsonM1 * RdsonM2 / (RdsonM1 + RdsonM2) \quad \text{Equation (2)}$$

The example described above shows that the power dissipation is provided by a large FET (M1) when in-rush current is high (and the smaller FET is OFF). However, during steady state operation, M1 and M2 are both ON and in parallel, and the smaller on-resistance value of the smaller FET (M2) is the most relevant. A time delay circuit causes M2 to turn ON after the inrush current is expected to have been dissipated. Accordingly, the design of FIG. 1 takes advantage of the power dissipation capabilities of the larger FET M1 while also taking advantage of the space savings accomplished by omitting other large FETs in favor of the smaller FET M2.

Figure 2:
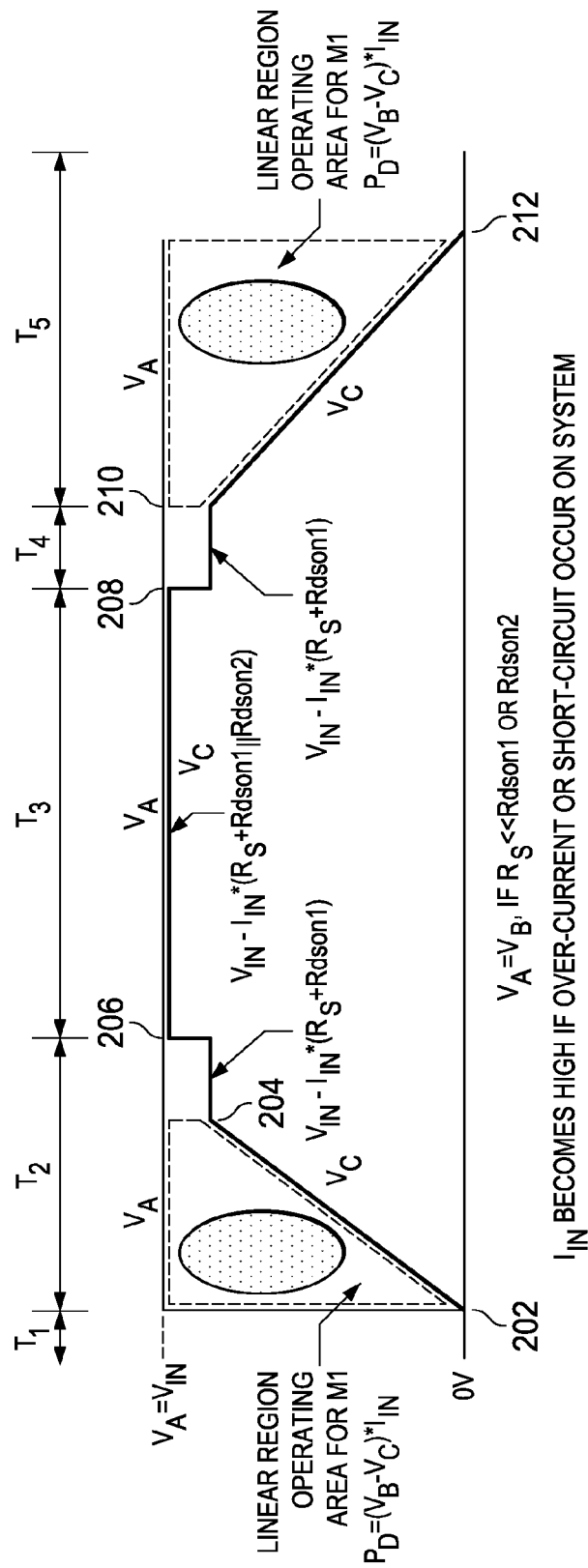
FIG. 2 is an illustration of example voltage levels in the circuit of FIG. 1.

Attention is now drawn to FIG. 2, which maps a voltage value at node VC over time for the embodiment of FIG. 1. T1 is simply the time before the voltage was applied to the board from the external voltage source. In this example, VA stays constant over the time period shown in FIG. 2 unless it goes to zero volts, and FIG. 2 illustrates VC compared with VA. Further, in this example, it is assumed that RS is much smaller than either the on-resistance of M1 (RdsonM1) or the on-resistance of M2 (RdsonM2); in other words, RS is negligible, and VA is approximately equal to VB.

At time point 202, the board is plugged into a hot power bus, and voltage is applied so that VA goes to VIN. Between time point 202 and time point 204, M1 operates in its linear region to dissipate the inrush current. At time 204, the inrush current is at zero or nearly zero, and M1 enters its ON state, but M2 is still OFF.

At the end of T2 (at time point 206), M2 goes from OFF to ON, and the system operates in steady state between time points 206 and 208. At time point 208, the system detects an over current event, and the following example (referring to FIG. 1) describes the operation at time points 208, 210, and 212.

After the system is powered up and the computing task begins, the over current comparator 150 in FIG. 1 monitors for an over current event based on the output of current sense amplifier 130. If the system pulls more current than the desired over current level programmed by VIOC, the over current comparator 150 toggles low, thereby driving the voltage at VX to zero. VIOC is programmed in a manner similar to that used to program VINRUSH, but VIOC is programmed to cause comparator 150 to toggle low at an appropriate over current level.

When the voltage at VX is zero, the capacitor C2 loses its voltage quickly since current is discharged through the forward biased diode D3. As a result, charge pump 160 controls the voltage VG2 to go to zero quickly, and M2 is immediately turned off.

The capacitor C1, on the other hand, discharges through R1 since the reverse biased diode D2 is blocking the discharge current. Thus, C1 and R1 form an RC network with an associated time delay. This time delay T4 is characterized by Equation (3), and M1 transitions from its ON state to its linear operating region at the end of T4 (time point 210). Time delay T4 ensures that M1 stays on even though M2 is turned off. T4 is illustrated in FIG. 2 between time points 208 and 210.

$$T4 = R1 * C1 \quad \text{Equation (3)}$$

Further at time point 210, M1 begins turning OFF but transitions to OFF through its linear region to dissipate power from the current. During time T5, VG1 decays with no manipulations from the feedback loop or any other control elements. The rate of the decay depends on the current-sinking capability of charge pump 140. As VG1 decays the state of M1 changes from an ON state to its linear region state, and eventually to an OFF state at the end of time T5.

At time point 212, M1 and M2 are both OFF. M2 does not experience a large power loss during its turn-off event at time 208 because M1 is still fully conducting at that time. M1 on the other hand, experiences power loss when its drain to source voltage increases from almost zero to the bus voltage and the residual current is still flowing. Whether the voltage at VC is increasing or decreasing, the power loss at M1 is given by Equation (4), where PD is power dissipated. These power losses are illustrated in FIG. 2 and the shaded portions of FIG. 2 correspond to the integral of the drain to source voltage.

$$PD = (VB - VC) * IIN \quad \text{Equation (4)}$$

Table 1 (below) summarizes the operation of M1 and M2 in the examples above and uses the same T1-T5 as shown in FIG. 2. The example begins with both M1 and M2 in an OFF state. At the beginning of T2, the board experiences a hot insertion and inrush current as CBulk charges. M1 is in its linear region until the inrush current is over, then M1 enters its ON state. At the very end of T2, M2 turns ON, in accordance with a built-in time delay.

T3 represents steady state operation for the board, where inrush current is over and there is no over current event detected. In steady state, both M1 and M2 are in their ON states and together have a relatively low equivalent on-resistance because M1 and M2 are arranged as a parallel network.

At T4, an over current event is detected by the over current comparator. In response, the circuit 100 of FIG. 1 turns M2 OFF relatively quickly. However, a time delay ensures that M1 is held open. M1 is not turned OFF immediately, as it transitions to OFF through its linear region.

TABLE 1

|  | M1 | M2 |
|---|---|---|
| T1 | OFF | OFF |
| T2 | linear region, then ON | OFF |
| T3 | ON | ON |
| T4 | ON | OFF |
| T5 | linear region, then ON | OFF |

In the examples above, M2 is described as transitioning to an ON state from an OFF state. However, in many operating examples, M2 changes from the OFF state to its linear region state before transitioning to its ON state during the turn on. Further, in many operating examples, M2 transitions from its ON state to its linear region state before transitioning to an OFF state during the turn off. However in either case, the power dissipation is nearly zero (or negligible) since the drain to source voltage of M2 is nearly zero (or negligible) when M1 is in its ON state. Therefore, the power dissipation during M2's linear region is insignificant compared to the power dissipated during M1's linear region. M1's maximum drain to source voltage is VIN (12V), while M2's drain to source voltage is kept at nearly zero (or negligible) when changing states. Thus the examples above refer to M2 changing its state from ON to OFF or OFF to ON because the linear region of M2 in those examples is insignificant.

Figure 3:
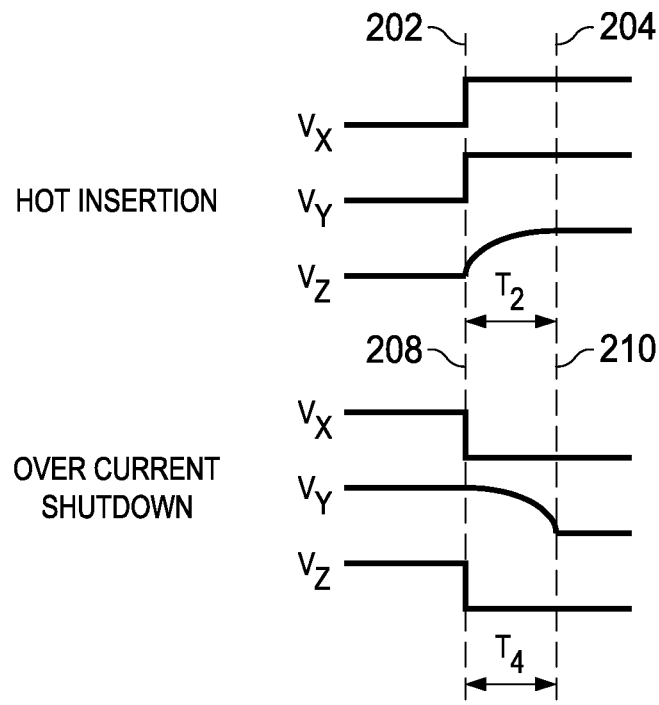
FIG. 3 is an illustration of example voltages in the circuit of FIG. 1.

FIG. 3 is an illustration of the voltages VX, VY, VZ during a hot insertion and during an over current shutdown, according to the embodiment of FIGS. 1 and 2. FIG. 3 illustrates the effects of the above-described time delays, as seen at VX, VY, VZ.

At the top of FIG. 3, a hot insertion scenario is illustrated. At time point 202, both VX and VY go from low to high very quickly because D2 conducts current to charge capacitor C1. However, D3 is reverse biased, so C2 charges through R2. The time to charge capacitor C2 is given by Equation (1) above. The top portion of FIG. 3 shows how V2 gradually increases over the time T2.

The bottom of FIG. 3 shows an over current shutdown scenario. At time 208, VX and VZ decrease very rapidly because C2 discharges through D3. However, C1 discharges through R1, and the time delay for discharging C1 is given by Equation (3). VY discharges gradually over T4. Accordingly, both the hot insertion scenario and the over current shutdown scenario include an associated time delay. The time delay for hot insertion ensures that M2 turns ON after the inrush current is dissipated, whereas the time delay for over current shutdown ensures that M1 remains on while M2 is OFF.

As mentioned above, M1 and M2 have different characteristics. Specifically, M1 is a FET with a wide SOA and a relatively high on-resistance. By comparison, M2 is a FET with a narrower SOA but a lower on-resistance. Of course, in this example, terms such as higher and lower, wider and narrower refer to M1 and M2 with respect to each other, rather than any type of absolute measurement.

Figure 4:
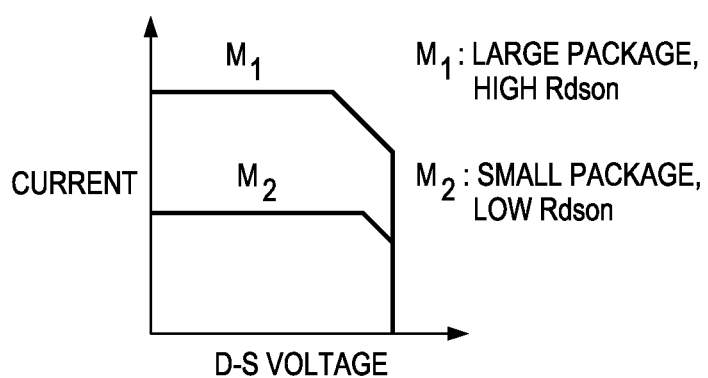
FIG. 4 is an illustration of example safe operating areas for instantaneous power for the FETs of FIG. 1.

FIG. 4 is an illustration of example SOAs of the FETs M1 and M2 of the embodiment of FIG. 1. SOAs in FIG. 4 are shown to facilitate a comparison between M1 and M2 and provide an indication of an instantaneous power handling capability for each of M1 and M2. The x-axis is drain-source voltage, and the y-axis is current. Thus, as shown here M1 and M2 have similar operating parameters for drain-source voltage, but M1 can safely conduct more current than can M2. One major factor in determining an SOA is package size. A larger package size may allow an FET to dissipate more energy because the larger package can conduct more heat away from the FET in a given time. In this example, M1 has a larger package than does M2. Thus, it is generally expected that an FET with a large package size would be more durable but would take up more space on a board when compared to an FET with a smaller package size.

The scope of embodiments is not limited to any particular size or on-resistance for M1 or M2. Rather, appropriate parameters for M1 and M2 may be chosen based on any appropriate factor, such as SOA, expected inrush current size, expected over current size, available space on the board to mount M1 and M2, desired on-resistance, and the like.

The embodiment of FIG. 1 is designed so that M1 is a durable FET that can operate in the linear region to dissipate inrush current and over current, whereas M2 is a fragile FET that operates typically in its ON state. M2's low on-resistance is used to minimize the voltage loss from VB to VC during normal operation, however its narrow SOA makes M2 prone to failures in start-up or over-current events.

M1, on the other hand, by conducting and dissipating IIN during the turn-on and the turn-off procedures, prevents M2 from being damaged by high power dissipation in start-up or over-current. The design of circuit 100 (FIG. 1) turns on M2 later than M1 and turns off M1 later than M2.

Figure 5:
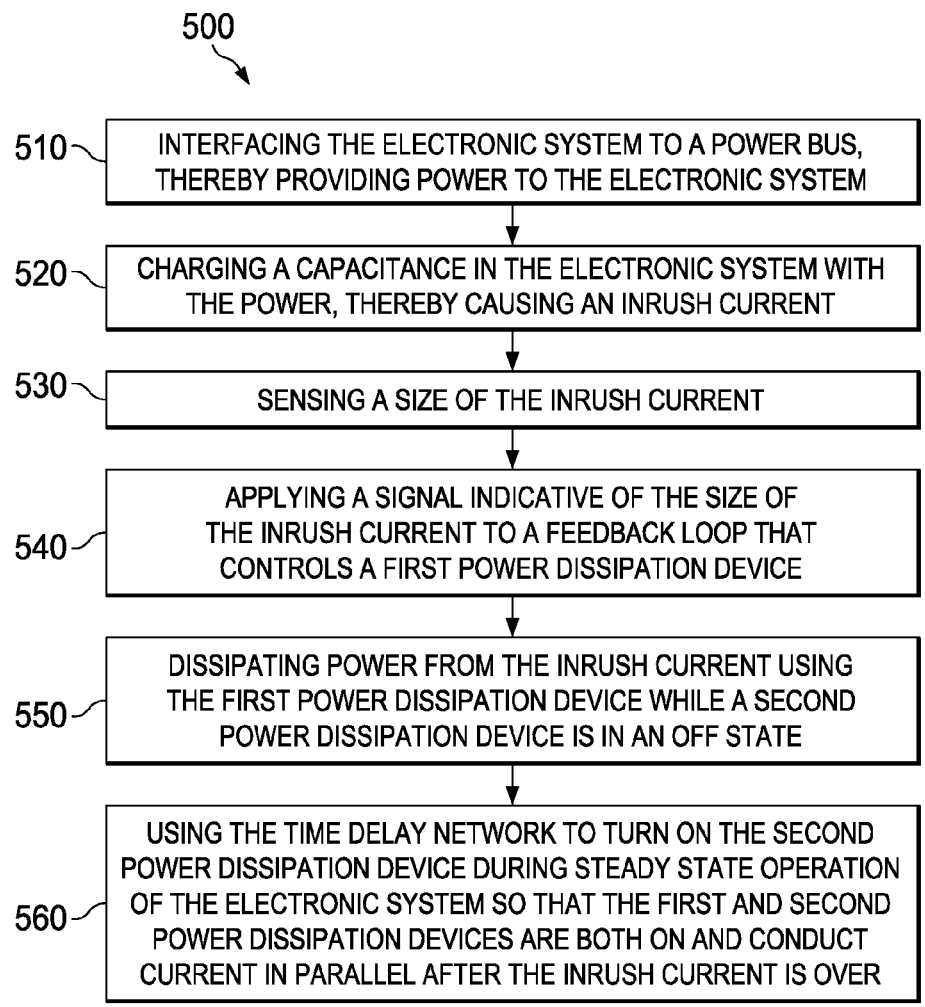
FIGS. 5 and 6 are illustrations of example methods according to embodiments.
Figure 6:
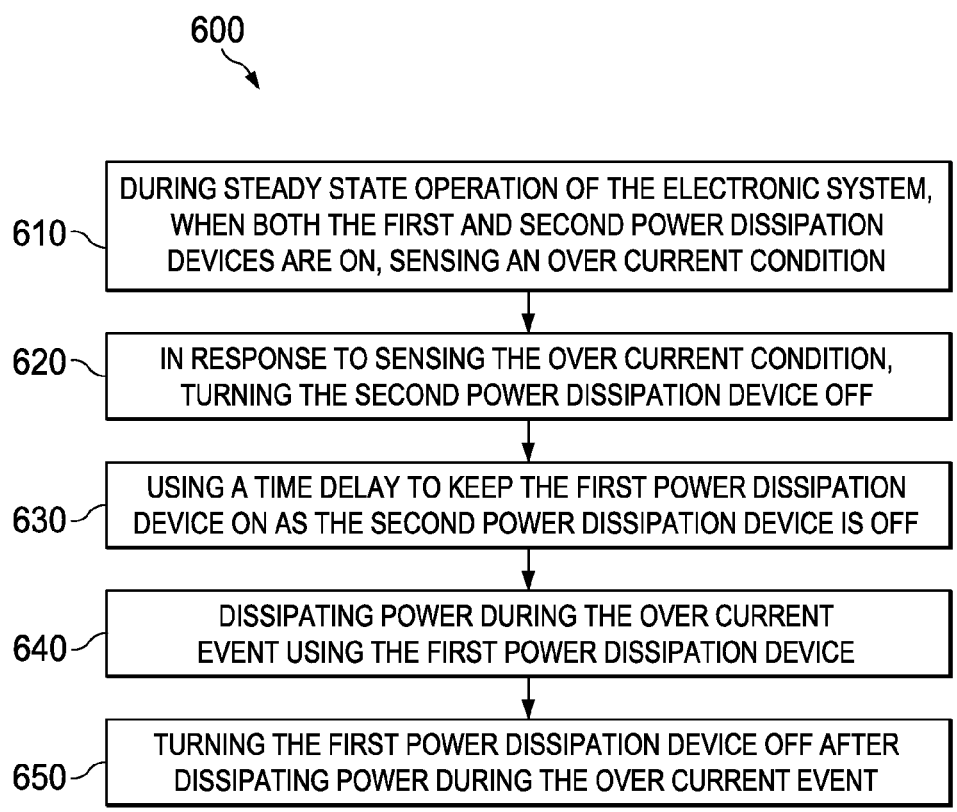

Various embodiments include methods for providing current protection to a hot-swappable system, such as a storage device or processor on a motherboard or blade. FIGS. 5 and 6 illustrate two example methods.

FIG. 5 is an illustration of exemplary method 500 adapted according to one embodiment. Method 500 may be performed by circuit 100 of FIG. 1 to dissipate inrush current and to provide a current path during steady state operation.

At block 510, method 500 includes interfacing the electronic system to a power bus, thereby providing power to the electronic system. For instance, a human or robot may insert a motherboard or blade into a system that is already powered up and has other components running. However, the scope of embodiments is not limited to blades or motherboards being inserted into a rack. Rather, any application that applies instantaneous power to an electronic device may benefit from the concepts discussed above by dissipating non-steady state currents.

At block 520, the circuit charges a capacitance with the power, thereby causing an inrush current. For instance, the operating circuit components (e.g., power conversion circuitry, computer processing circuitry, and the like) may have intentional and/or parasitic capacitance that charges when power is initially applied. The inrush current is the current that charges the capacitive components, and it is in addition to any applicable operating current.

At block 530, the circuit senses a size of the inrush current. For instance, the embodiment of FIG. 1 uses a current sense amplifier that has its inputs sensing the voltage difference across a sense resistor RS. Any appropriate technique to sense an inrush current is within the scope of embodiments.

At block 540, the circuit applies a signal indicative of the size of the inrush current to a feedback loop that controls a first power dissipation device. For instance, as shown in FIG. 1 the current sense amplifier 130 provides a signal to the feedback loop 110 to control the operation of FET M1. The feedback loop controls M1 to operate in its linear region to dissipate the inrush current and thereby control the size of the inrush current.

At block 550, the circuit dissipates power from the inrush current using the first power dissipation device while a second power dissipation device is in an off state. For instance, in the embodiment of FIG. 1, M1 is in its linear operating region as M2 is OFF. Thus, substantially all current goes through M1 during this time. During its linear operating region, M1 controls the inrush current by providing the current to charge Cbulk. Thus, in one aspect, M1 provides a controlled inrush current that is at a safe level and charges Cbulk in a reasonable time.

At block 560, the circuit uses the time delay network to turn on the second power dissipation device during steady state operation of the electronic system. Therefore, the first and second power dissipation devices are both on and conduct current in parallel after the inrush current is over. For instance, during steady state operation of the device of FIG. 1, both M1 and M2 are in their ON states and are arranged in parallel so that the lower on-resistance of M2 makes for an especially low equivalent on-resistance of M1 and M2 together.

Various embodiments may add, omit, rearrange, or modify the actions of method 500. For instance, some embodiments also include performing a shutdown in response to detecting an over current scenario during steady state operation. FIG. 6 is an illustration of an example method 600 for protecting an electronic system from an over current event. Method 600 may be performed by a current protection circuit, such as circuit 100 of FIG. 1. Method 600 protects the electronic system from damage by high current by dissipating the current and then shutting the system down.

At block 610, the circuit senses an over current condition during steady state when both of the power dissipation devices are on. For instance, in the embodiment of FIG. 1, over current comparator 150 may detect an over current condition and toggle its output. An over current condition can be defined for a given electronic system according to the system's operating parameters. For instance, in many systems, an over current condition will include current higher than that expected for inrush current and may include any current level that is potentially harmful to circuitry in the system.

At block 620 the circuit turns the second power dissipation device off in response to sensing the over current condition. For instance, in the example of FIG. 1, when over current comparator 150 toggles its output, the voltage VX goes to zero relatively quickly and turns M2 off. After the second power dissipation device turns off, only the first power dissipation device conducts current.

At block 630, the circuit uses a time delay to keep the first power dissipation device on even as the second power dissipation device is off. For instance, the embodiment of FIG. 1 uses an RC network to delay transitioning M1 from its ON state to its linear operating region.

At block 640, the circuit dissipates the current using the first power dissipation device. For instance, M1 is operated in its linear region to dissipate power.

At block 650, the circuit turns the first power dissipation device off. At this point, both the first and the second power dissipation devices are off, and there is no current conducted from the power input to the operating circuitry.

The scope of embodiments is not limited to the examples of FIGS. 1-6. For instance, some embodiments may include more power dissipation devices than are shown in FIG. 1. Thus, depending on an amount of space available in an electronic system, a designer may choose to include more than one large-package device and/or more than one small-package device. In such a system, the additional devices may be placed into the parallel arrangement, and the large-package devices would be operated according to the timing of M1, and the small-package devices would be operated according to the timing of M2 in the examples above. In fact, various embodiments may be scaled as appropriate in a particular system.

The described embodiments may include one or more advantages over other techniques. For instance, various embodiments omit the parallel of arrangement of large FETs found in conventional systems. Instead, various embodiments achieve acceptable inrush protection and low on-resistance by a parallel arrangement of a larger FET and a smaller FET with a time delay. As a result, some embodiments achieve a space savings on a board or other electronic layout.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computing device comprising:
a power connector to interface with a power source;
logic and power components on a current path from the power connector; the power connector providing electrical power to the logic and power components; and
an inrush protection circuit on the current path between the power connector and the logic and power components, the inrush protection circuit including:
a first power dissipation device and a second power dissipation device arranged in parallel on the current path; and
a feedback loop to detect an amount of current in the current path and to control the first power dissipation device to operate in a manner to dissipate detected inrush current in an inrush mode of operation by controlling a gate voltage of the first power dissipation device based on a reference voltage to control the inrush current to achieve a target current value,
wherein during steady state operation of the computing device both the first and second power dissipation devices are in an on state, and
wherein, during the steady state operation of the computing device, an effective resistance of the combined first and second power dissipation devices is substantially equal to a drain-to-source resistance of the first power dissipation device in the on state in parallel with a drain-to-source resistance of the second power dissipation device in the on state.

2. The computing device of claim 1 in which the computing device comprises a processor motherboard.

3. The computing device of claim 1 in which the computing device comprises a data storage device.

4. The computing device of claim 1 in which the first and second power dissipation devices comprise first and second Field Effect Transistors (FETs), respectively.

5. The computing device of claim 4 in which the first FET has a larger Safe Operating Area (SOA) and a larger on-resistance than does the second FET.

6. The computing device of claim 4 in which the first FET operates in a linear region to dissipate detected inrush current.

7. The computing device of claim 1 further comprising a first time delay network in communication with the second power dissipation device and causing a delay for the second power dissipation device to transition to an on state, in which the first time delay network comprises a resistor charging a capacitor.

8. The computing device of claim 7 further comprising a second time delay network in communication with the first power dissipation device, the second time delay network keeping the first power dissipation from turning off during an over current event.

9. The computing device of claim 1 further comprising an overvoltage comparator that receives input indicative of a current level on the current path and turns the second power dissipation device off in response to detecting an over current event.

10. A hot-swappable electronic system, the system comprising:
a power input providing power from a power source, over a current path, to operating circuitry;
an inrush current protector on the current path between the power input and the operating circuitry, the inrush current protector comprising:
a first power dissipation Field Effect Transistor (FET) device of a first size in communication with a feedback loop to control the first power dissipation FET device to provide an inrush current and to operate in an on state during steady state operation of the electronic system; and a second power dissipation FET device of a second size different from the first size in communication with a first time delay network to control the second power dissipation FET device to operate in an on state during steady state operation of the electronic system, the first and second power dissipation FET devices being configured in a parallel network such that a drain of the first power dissipation FET is directly electrically coupled to a drain of the second power dissipation FET and further such that a source of the first power dissipation FET is directly electrically coupled to a source of the second power dissipation FET, wherein the feedback loop includes a control circuit in communication with the first power dissipation FET and operable to:

monitor the provided inrush current; and control a gate voltage of the first power dissipation FET device based on a reference voltage to achieve a target current value for the provided inrush current.

11. The hot-swappable electronic system of claim 10 further comprising the first time delay network in communication with the second power dissipation FET device and in which the first time delay network comprises:

a resistor and a capacitor, the resistor charging the capacitor through a diode to provide a time delay.

12. The hot-swappable electronic device of claim 10 comprising a motherboard hosting the operating circuitry and the inrush current protector.

13. The hot-swappable electronic device of claim 11 further comprising a second time delay network in communication with the first power dissipation FET device, the second time delay network keeping the first power dissipation FET device from turning off during an over current event.

14. The hot-swappable electronic device of claim 10 in which the control circuit of the feedback loop comprises:

an operational amplifier with feedback from its output to its inverting input, wherein its inverting input also receives a signal from a current sense device that senses current on the current path.

15. The hot-swappable electronic device of claim 10 in which the first power dissipation FET device has a larger on-resistance and a larger package than does the second power dissipation FET device.

16. The hot-swappable electronic device of claim 10 further comprising a bulk capacitance that charges during a hot insertion and causes the inrush current.

17. The hot-swappable electronic device of claim 10 further comprising an overvoltage comparator that receives input indicative of a current level on the current path and turns the second power dissipation FET device off in response to detecting an over current event.

18. A method for handling current in a hot-swappable electronic system, the method performed using a current protection circuit that includes a first power dissipation device and a second power dissipation device, where the second power dissipation device is associated with a time delay network, the method comprising:

interfacing the electronic system to a power source, thereby providing power to the electronic system;

charging a capacitance in the electronic system with the power, thereby causing an inrush current;

sensing the inrush current and dissipating power from the inrush current using the first power dissipation device while the second power dissipation device is in an off state;

controlling operation of the first power dissipation device such that the inrush current meets a target current value specified by a reference voltage; and using the time delay network to turn on the second power dissipation device after the inrush current is over so that the electronic system has a low impedance after the first and second power dissipation devices are on, wherein the low impedance is substantially equal to a drain-to-source impedance of the first power dissipation device in parallel with a drain-to-source impedance of the second power dissipation device.

19. The method of claim 18 further comprising:

sensing an over current event;

turning the second power dissipation device off in response to sensing the over current event; and further in response to sensing the over current event, maintaining the first power dissipation device in an on state during a time delay.

20. The method of claim 18 in which the first power dissipation device comprises a Field Effect Transistor (FET) and in which dissipating power from the inrush current comprises:

operating the FET in a linear operating region.

21. The method of claim 18, wherein the dissipating of power from the inrush current using the first power dissipation device includes operating the first power dissipation device in a linear operating region.

* * * * *